Sept. 10, 1968  J. STRANGE  3,400,743

SHEET METAL FASTENER WITH RESILIENT ARMS

Filed May 12, 1966

INVENTOR.

BY *John Strange*

*Isare, Isare & Sammon*

ATTORNEYS

United States Patent Office 3,400,743
Patented Sept. 10, 1968

3,400,743
SHEET METAL FASTENER WITH
RESILIENT ARMS
John Strange, Llanishen, Cardiff, Wales, assignor to
Tinnerman Products, Inc., Cleveland, Ohio, a
corporation of Ohio
Filed May 12, 1966, Ser. No. 549,510
Claims priority, application Great Britain, May 18, 1965,
21,038/65
5 Claims. (Cl. 151—41.73)

ABSTRACT OF THE DISCLOSURE

A fastening device for securement in a recess in a mounting member for connecting a part to the mounting member upon insertion of a threaded member through the device comprising a body having an aperture for receiving the threaded member, the body having thread engaging construction adjacent the aperture for threaded engagement with the threaded member, a pair of resilient arms depending downwardly from opposed ends of the body, and the arms having laterally spaced shoulder portions between which the threaded member is to be inserted so that the extremities of the arms are moved into biting engagement with the material of the mounting member upon insertion of the threaded member through said device.

---

The present invention relates to sheet metal nuts adapted to be inserted in a recess in a mounting member for cooperation with a bolt or similar screw-threaded fastener in connecting a part to the mounting member.

An object of the invention is to provide a nut of this kind which can be used to assemble a part on a mounting member in such a way that there is little danger of the nut becoming detached from the mounting member or of the co-operating bolt working loose by vibration. The nut is more particularly, but not exclusively, designed for insertion in a recess in a plastic molding of a cabinet or escutcheon of plastic material for the purpose of mounting a component such as a loudspeaker, the plastic molding being provided with a nut-receiving recess which may be either closed-ended or open-ended in the form of an orifice.

The invention provides a one-piece sheet metal nut adapted to be inserted in a recess in a mounting member for cooperation with a bolt or similar screw-threaded fastener in connecting a part to the mounting member, the nut comprising a strip of resilient sheet metal bent to provide an intermediate bolt-receiving body portion and a pair of resilient arms extending from the body portion in the same general direction, the bolt-receiving body portion being provided with integral pre-formed thread engaging means and abutment means for engaging the mouth of the recess in the mounting member, the arms converging from the body portion and then being return bent to form opposed intermediate shoulders and outwardly and backwardly facing extremities, the shoulders being spaced apart a distance less than the major diameter of the shank of the co-operating bolt, and the arms being adapted to be inserted in the recess so that the bolt, as it is advanced axially into the nut, engages the shoulders to cause an expansion of the arms whereby the arm extremities bite into the walls of the recess to anchor the nut securely in the mounting member while the shoulders impart a prevailing torque to the bolt.

The invention includes a mounting assembly comprising the aforesaid one-piece sheet metal nut in combination with a mounting member of plastics material having a recess with substantially parallel walls spaced apart a distance sufficient to accommodate the arms of the nut while allowing the extremities of the arms to anchor in the recess walls when a bolt is advanced into the nut.

Figure 1:
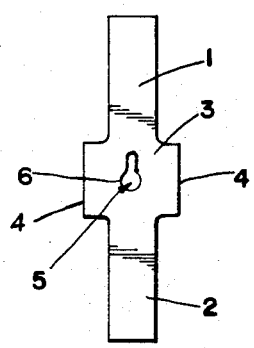
Figure 2:
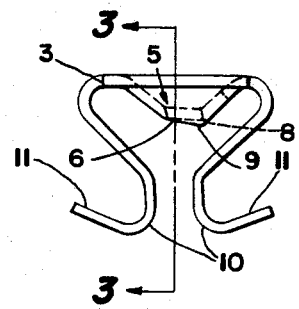
Figure 3:
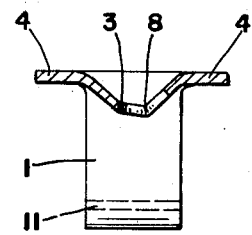
Figure 4:
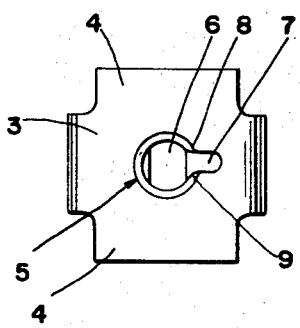
Figure 5:
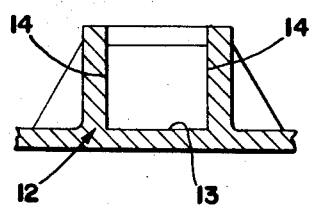
Figure 6:
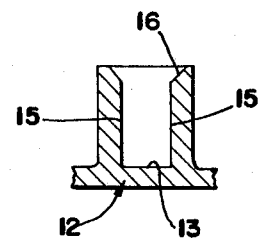
Figure 7:
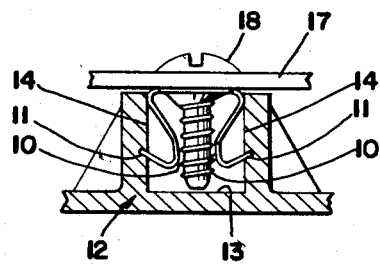

In order that the invention may be clearly understood, a preferred embodiment thereof will now be described by way of example with reference to the accompanying drawings, in which:

FIG. 1 is a top plan view of a blank from which the nut may be made;
FIG. 2 is a side elevation view of the fully formed nut;
FIG. 3 is a vertical section view taken along the line 3—3 of FIG. 2;
FIG. 4 is a top plan view of the nut;
FIG. 5 is a fragmentary longitudinal section view of the mounting member for assembly with the nut;
FIG. 6 is a fragmentary transverse section view of the mounting member of FIG. 5; and
FIG. 7 is a somewhat schematic view in longitudinal section showing the manner in which a part is connected to the mounting member by means of the nut and a co-operating bolt.

As shown in FIG. 1, the nut blank comprises a strip of spring steel having a pair of resilient arms 1, 2 and an intermediate bolt-receiving body portion 3. Body portion 3 has side flanges 4 constituting abutment means for engaging the mouth of a recess in a mounting member as further described below, and integral thread engaging means 5 are pre-formed in the central region of the body portion. As illustrated more clearly in FIGS. 2 and 4, these thread engaging means 5 comprise a circular aperture 6 which has a slot 7 extending therefrom. The metal at the junction between slot 7 and aperture 6 provides tongues 8 and 9 which are bent out of the plane of the blank until the marginal edge of the aperture 6 is caused to conform to the helix of the thread of a co-operating bolt with which the nut is designed to be used.

In forming the nut from the blank, the resilient arms 1 and 2 are bent so as to extend in the same general direction out of the plane of the body portion 3 and, as shown in FIGS. 2 to 4, the arms at first converge from the body portion and are then return bent to form opposed intermediate shoulders 10 and outwardly facing extremities 11. The shoulders 10 are spaced apart a distance less than the major diameter of the shank of the co-operating bolt, so that when a bolt is threaded through the engaging means 5, it can only pass between the shoulders by expanding the arms 1, 2 in an outward direction.

FIGS. 5 and 6 show a mounting member suitable for use with the nut. The member is in the form of a polymeric molding 12 having a generally rectangular recess 13 with parallel opposed end walls 14. The side walls 15 of the recess are also generally parallel but the side walls are bevelled at the mouth of the recess as indicated at 16. The dimensions of the recess 13 are such that the arms 1, 2 of the nut may be inserted in the recess with the extremities 11 of the arms abutting or adjacent to end walls 14, while side flanges 4 of body portion 3 of the nut engage the bevelled mouth 16 of the recess.

Connection of a part 17 to the molding 12 by means of the nut and a co-operating bolt 18 is illustrated in FIG. 7. The shank of bolt 18 is first passed through an orifice in part 17 and then threaded through body portion 3 of the nut. As the bolt shank advances axially into the nut, it engages the shoulders 10 and causes an expansion of the arms whereby the arm extremities 11 bite into the end walls 14 of recess 13 to anchor the nut securely in the molding 12, and at the same time the shoulders 10 bear upon the threaded bolt shank so as to impart a prevailing torque to the bolt. The body portion 3 of the nut also tends to rise slightly from its seating on the molding when the bolt passes between the shoulders 10, and this effect can also be useful as providing a form of resilient cushioning for the part 17.

The nut is particularly useful for mounting loudspeakers to cabinets or escutcheons of plastics material, and it has certain particular advantages when used for this purpose which are additional to its simplicity and economy of manufacture. The prevailing torque exerted by the nut upon the co-operating bolt overcomes vibration loosening problems which are frequently experienced in such applications, and in addition the method of anchoring by using return bent ends of the spring arms effectively overcomes any tendencies towards cold flow in the plastics material of the mounting, such tendencies having also been troublesome in the past when anchoring by the use of more conventional means. Further, the tendency of the body portion of the nut to rise from its seating upon assembly effectively creates a spring platform on which the loudspeaker rests and the resilience thereby afforded offsets transit shocks which are troublesome with solid mountings during transport. Such shocks can be appreciable when a relatively heavy part such as a loudspeaker is transported by post or otherwise, and the result has often been that the loudspeaker breaks away from its cabinet.

Preferably, the distance between the extremities 11 of the resilient arms 1 and 2 in the free state of the nut before it is inserted into the recess in the mounting member should be slightly greater than the distance between the corresponding walls 14 of the recess. This allows the nut to be initially self retaining, so that for example a number of the nuts can be fitted into corresponding recesses in mounting members at an earlier point on a production line than the point of final assembly by means of co-operating bolts. The nut is fitted into its recess by pressure, the outwardly and backwardly facing extremities of the arms facilitating insertion of the nut into the recess by slight inward deformation of the resilient arms while effectively resisting any tendency for the nut to become detached from the mounting member before assembly is completed.

I claim:
1. A self-retaining fastening device adapted for insertion in a recess in a polymeric mounting member for coacting engagement with a threaded member in connecting a part on said mounting member, said device made from a cruciform blank of sheet metal comprising a generally flat body, said body having a centrally located aperture with the marginal edge of said aperture being bent outwardly of the general plane of said body to provide a generally helix construction for complementary threading engagement with said threaded member when inserted through said aperture, said body including a pair of spaced, oppositely disposed resilient arms extending downwardly therefrom for insertion into the recess in said mounting member, said arms first being bent downwardly and inwardly, to form curved portions adapted for engagement with the confronting interior surfaces of said recess to prevent lateral shifting movement of said body with respect to said mounting member, then axially with respect to one another to form spaced, oppositely disposed elongated shoulders extending generally parallel to one another, and then being bent outwardly and upwardly at an acute angle with respect to said axially extending shoulders in a general direction toward said body to form backwardly facing extremities, the transverse distance between said shoulders being less than the maximum transverse dimension of said threaded member and the transverse distance between the terminal ends of said extremities being greater than the maximum transverse dimension of the recess in said mounting member so that as said threaded member is inserted through said aperture said shoulders are moved laterally apart for expanding said arms in an outward direction for moving the terminal ends of said extremities upwardly and outwardly into biting engagement with the polymeric material of said mounting member for maintaining said shoulders in torque bearing engagement with said threaded member, and for simultaneously causing axial deformation of said arms lengthwise of said recess to raise said body slightly above said mounting member, thereby to hold said part in resiliently spaced relationship with respect to said mounting member.

2. A fastening device in accordance with claim 1, wherein said body includes a pair of oppositely disposed flange portions extending laterally outwardly and generally co-planar with respect to said body, said flange portions adapted to provide abutting engagement with the marginal edges formed by the recess in said mounting member.

3. A fastening device in accordance with claim 1, including, in combination, a mounting member made of polymeric material and having a polygonal recess defined by at least two upstanding parallel walls.

4. A fastening device in accordance with claim 3, wherein said walls are spaced apart a distance less than the transverse distance between the terminal ends of said extremities prior to insertion of said arms into the recess in said mounting member.

5. A fastening device in accordance with claim 4, wherein the polygonal recess in said mounting member is defined by a pair of oppositely disposed parallel end walls and a pair of oppositely disposed parallel side walls, said side walls being provided with a bevel at the mouth of said recess.

References Cited

UNITED STATES PATENTS

| 2,356,934 | 8/1944 | Ketcham | 151—41.72 |
| 3,093,178 | 6/1963 | Boyd | 151—41.73 |
| 3,148,579 | 9/1964 | Giovannetti | 83—83 |

FOREIGN PATENTS

| 505,659 | 5/1939 | Great Britain. |
| 654,901 | 7/1951 | Great Britain. |
| 1,372,146 | 4/1961 | France. |

MARION PARSONS, JR., *Primary Examiner.*